United States Patent [19]
Lawson et al.

[11] Patent Number: 5,587,419
[45] Date of Patent: Dec. 24, 1996

[54] METHOD FOR THE MANUFACTURE OF WEATHERABLE, RIGID EXTRUSION PROFILES HAVING IMPROVED SURFACE APPEARANCE

[75] Inventors: Dennis L. Lawson, Brunswick; Robert E. Detterman, Medina, both of Ohio

[73] Assignee: The B.F. Goodrich Company, Akron, Ohio

[21] Appl. No.: 541,745

[22] Filed: Oct. 10, 1995

Related U.S. Application Data

[63] Continuation-in-part of Ser. No. 365,338, Dec. 28, 1994, abandoned, which is a continuation of Ser. No. 23,542, Feb. 26, 1993, abandoned.

[51] Int. Cl.$^6$ .............. C08L 23/28; C08L 27/24; C08K 3/34; C08K 5/04
[52] U.S. Cl. .............. 524/527; 524/450; 524/381; 524/280; 525/239; 525/192; 264/176.1
[58] Field of Search .................. 525/239, 192; 524/527

[56] References Cited

U.S. PATENT DOCUMENTS

| | | | |
|---|---|---|---|
| 3,006,889 | 10/1961 | Frey | 260/45.5 |
| 3,268,623 | 8/1966 | Beer | 260/876 |
| 3,283,035 | 11/1966 | Schnebelen, Jr. | 260/897 |
| 3,291,863 | 12/1966 | Frey et al. | 260/897 |
| 3,299,182 | 1/1967 | Jennings et al. | 260/897 |
| 3,364,163 | 1/1968 | Kraemer et al. | 260/23 |
| 3,453,347 | 7/1969 | Dreyfuss et al. | 260/897 |
| 3,459,692 | 8/1969 | Buning et al. | 524/399 |
| 3,467,732 | 9/1969 | Schnebelen et al. | 260/897 |
| 3,642,948 | 2/1972 | Bauer et al. | 260/867 R |
| 3,856,891 | 12/1974 | West et al. | 260/897 |
| 3,940,456 | 2/1976 | Frey et al. | 260/897 |
| 4,213,891 | 7/1980 | Wear | 260/45.75 |
| 4,280,940 | 7/1981 | Klug et al. | 260/23 XA |
| 4,481,333 | 11/1984 | Fleischer et al. | 525/192 |
| 4,710,533 | 12/1987 | Neuman | 524/394 |
| 4,749,751 | 6/1988 | Ennis et al. | 525/192 |

FOREIGN PATENT DOCUMENTS

| | | |
|---|---|---|
| 626534 | 8/1961 | Canada . |
| 0510310 | 10/1992 | European Pat. Off. . |
| 0568922 | 11/1993 | European Pat. Off. . |
| 0612602 | 8/1994 | European Pat. Off. . |
| 2008674 | 1/1970 | France . |
| 47-35780 | 9/1972 | Japan . |
| 1201986 | 8/1970 | United Kingdom . |
| 1234135 | 6/1971 | United Kingdom . |

OTHER PUBLICATIONS

Chemical Abstracts, vol. 119, No. 20; Nov. 15, 1993; Columbus, Ohio, U.S.; Abstract No. 205135, Japanese JP-A-05 138 708.
Encyclopedia of Chemical Technology, Third Edition, vol. 16, "Noise Pollution To Perfumes", pp. 418–419, 424–425 and 434–441.

*Primary Examiner*—Carman J. Seccuro, Jr.

[57] ABSTRACT

Blends of chlorinated polyvinyl chloride and chlorinated polyethylene and methods for preparing extruded profiles such as a window spacer, a glazing bead, a window lineal, and a track for lighting, having smooth surface characteristics are disclosed. The blends comprise 100 weight parts CPVC containing from 62% to 72% chlorine, preferably 65% to 71% chlorine and from 10 to 30 weight parts, preferably 15 to 25 parts of chlorinated polyethylene containing from 25 to 45% chlorine and extruding the blend. The preferred embodiments of the invention are further defined by a particular combination for the chlorine content of CPVC, the real weight average molecular weight of CPE ($M_w$) and polydispersity ($M_w/M_n$), defined as the ratio of the weight average to number average molecular weight, and extrusion shear rate.

22 Claims, 3 Drawing Sheets

VERY SMOOTH

SMOOTH

SEMI-SMOOTH

SLIGHTLY ROUGH

ROUGH

VERY ROUGH

METHOD FOR THE MANUFACTURE OF WEATHERABLE, RIGID EXTRUSION PROFILES HAVING IMPROVED SURFACE APPEARANCE

This is a continuation-in-part of application Ser. No. 08/365,338, filed Dec. 28, 1994, which is a continuation of Ser. No. 08/023,542, filed Feb. 26, 1993, both now abandoned.

FIELD OF THE INVENTION

This invention pertains to blends of post-chlorinated polyvinyl chloride (CPVC) and chlorinated polyethylene (CPE), and methods for making extruded rigid profiles from the blends and exhibiting smooth satin surface appearance.

BACKGROUND OF THE INVENTION

Combinations of polyvinyl chloride and chlorinated polyethylene are established in the art, for example, flexible wire and cable cladding. Blends of PVC and chlorinated polyethylene are recognized as contributing both impact modifying characteristics as well as ease of melt processing. Chlorinated polyethylene is not particularly efficient when utilized as the sole impact modifier with PVC, hence an amount needed to boost notched Izod Impact strength to at least about 10 lb.-ft./inch notch will lead to appreciable loss in rigidity, measured as tensile of flexural modulus.

There have been suggested graft copolymers of chlorinated polyethylene and PVC. Ludwig Beer, in 1962 suggested in U.S. Pat. No. 3,268,623 that improvements in properties could be obtained by dissolving CPE in vinyl chloride monomer and suspension polymerizing to yield an improved combination compared to mechanical blending of the two resins.

In U.S. Pat. No. 4,481,333 Fleisher et al. disclosed the combination of PVC, CPE, and fluoropolymer. There it was taught that if prior to combining with PVC, fluoropolymer and CPE are first combined, a 10-fold lesser quantity of fluoropolymer (PTFE) provided the same magnitude of reduction in extruder torque compared to a ternary mixture.

Hankey disclosed in Canadian Patent No. 636,534 that on the addition of 19 weight parts of CPE "per 100 weight parts of PVC" (phr), room temperature notched Izod impact strength improved to 24 ft.-lb./inch notch. Hankey showed that at this level of CPE, the flexural modulus of PVC was lowered from 400,000 psi to 270,000 psi, while in a combination 5 parts of CPE, 5 parts of a rubbery diene type polymeric impact modifier and 90 parts of PVC, room temperature notched Izod impact was comparable but rigidity was not sacrificed to the same degree. The samples demonstrated were milled and compression molded, with no teaching to extrusion characteristics.

Frey and Klug disclosed in U.S. Pat. No. 3,940,456 that extruded PVC blends with chlorinated high pressure polyethylene may, in certain instances, exhibit coarseness, i.e., rough extrusion characteristics. They proposed to solve this problem by employing a CPE which had been chlorinated in the presence of a finely-divided silicic acid and siloxane oil. The CPE described was of high molecular weight characterized by a specific viscosity and methylcyclohexane swell. The swell number indicated the "through" chlorination, i.e., the degree to which all chains were chlorinated.

Klug and Frey disclosed in U.S. Pat. No. 4,280,940 the combination of PVC and two CPE's to provide improved transparency for weatherable blends. They noted that the incorporation of CPE with methylcyclohexane (MCH) swell of more than 10% lead to reduced transparency. Klug and Frey also noted that the combination of CPE and PVC with K value 70 is difficult and can lead to rough extrudate. They proposed a combination of PVC (K=55–65) and two CPE's, one having a low MCH swell, and both containing 37–42% chlorine.

With respect to CPVC/CPE blends, Jennings and Kliner of the B.F.Goodrich Co. disclosed in U.S. Pat. No. 3,299,182 the combination of impact improvement and processing enhancement of CPVC with small amounts of homogeneously chlorinated low pressure, high density polyethylene at usage levels of from 2 to 10 phr. Processing aids, plasticizers and impact modifiers were preferably avoided. The examples illustrated a variety of chlorinated polyethylene base polymers combined at 5 parts per 100 parts CPVC (phr), the CPVC having a density of 1.57 g/cc, corresponding to a chlorine content of about 66%. CPE and CPVC were precipitated from cements, dried, milled and pressed for determination of heat distortion temperature (HDT) and IZOD impact strength. The CPE chlorine content from 30–40% was preferred and impact strength was maximized using most types of base polyethylene having about 35% chlorine content. Exceptions to this trend occurred with a copolymer of ethylene and butene having a relatively high melt index. The preferred Zeigler type polyethylenes chlorinated to about 30–32% always gave higher impact strength than those with higher chlorine content. It was noted that extrusion speed and appearance of the extrudate was best at 7 phr CPE, while at 10 phr and higher, chemical resistance and HDT were detrimentally altered.

Dreyfuss and Tucker also of The BFGoodrich Company disclosed in U.S. Pat. No. 3,453,347 that enhanced melt flow rate and processing stability of CPVC/CPE blends can be obtained by the addition of 0.25 to 2.5 phr of rubbery amorphous polyalkylene mono-epoxide. One aspect of the '347 patent was to obtain a combination of HDT and impact resistance with from 5 to 10 phr CPE. A small effective amount, on the order of 1 to 2 phr of the amorphous rubbery epoxide imparted higher melt flow rates. The working examples were prepared by milling and compression molding, while melt flow rate was measured by a small extrusion rheometer. The best melt flow rate/HDT/impact strength balance was observed at CPE use levels of 7.75 phr.

Buning, et al have taught in U.S. Pat. No. 3,459,692 that due to the higher crystallinity of stereo-regular CPVC and the tendency of a cooling melt to re-crystallize, molded articles from a blend of CPE and stereo-regular CPVC are more brittle than blends with atactic CPVC. They found that milled, pressed sheets of a blend of CPE and CPVC, where the CPVC was derived from 55 to 85% syndiotactic PVC were shown to exhibit toughness, no re-crystallization tendency and had higher corresponding Vicar softening temperatures than with the atactic CPVC blend.

More recently, G. Wear in U.S. Pat. No. 4,213,891 disclosed the use of a combination of high and low molecular weight chlorinated polyethylene with CPVC for calendared sheets having improved thermoforming characteristics. Another object of Wear was the use of PVC/acrylate based impact modifier for compounds with reduced smoke emission. CPVC having 66% chlorine was combined with 15 phr CPE (36% Cl and Mw greater than 1,000,000) and 7.5 phr CPE (22% Cl and Mw less than 100,000). The blend was fluxed on a Banbury/mill then fed into a calendar stack to produce a uniform 0.010–0.017 inch sheet.

There have been found no detailed published reports systematically studying the extrusion characteristics of CPVC/CPE blends in which CPE is present above 10 phr. Blends of PVC and CPE exhibit more consistent melt characteristics than blends of post-chlorinated PVC and CPE. Although at low levels of 1 to 5 phr, CPE imparts improved impact strength and processibility under low shear extrusion, the behavior of extrudates containing more than 10 phr CPE under higher shear conditions is different. The differences with PVC can not be extrapolated to CPVC blends. Good processibility suggests lower viscosity, torque and work input, hence processing stability, however this does take account of the variations in extrusion quality observed over varied conditions, varying chlorination level or molecular weight of CPE and CPVC.

Compared to PVC, chlorinated PVC exhibits higher density, higher Tg, improved resistance to solvent and chemical attack, requires higher extrusion temperature with greater susceptibility to degradation, higher melt viscosity and brittleness, these properties vary with different chlorine content of CPVC. The heat distortion temperature for homo-PVC is about 75° C. whereas it is 80° C. to 130° C. for chlorinated PVC, and is proportionate with chlorine content. Likewise, Vicat softening point for PVC is at least about 30° C. lower for chlorinated PVC. As the temperature of processing increases with CPVC chlorine content, blend morphology with CPE varies.

As illustrated below relatively 63–65% chlorine content CPVC is observed to behave differently with CPE than CPVC with relatively high chlorine content due in part to changing morphology with temperature. Whereas homo-PVC has a characteristic viscosity range for given molecular weight, its structure is uniform, made up of repeating units having the following structure:

(I)

whereas chlorinated PVC is a combination of three structures, one of which corresponds to the repeating unit of PVC (I), and two other repeating unit types:

(II)

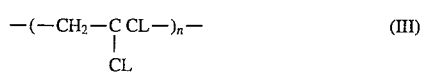
(III)

The proportion of structures I, II and III for CPVC varies with chlorine content, the higher the chlorine content the higher proportion of structures II and III and the lesser proportion of structure I. Correlation between chlorine content and proportion of structures I, II and III in non post-chlorinated and chlorinated PVC is set forth in Table A below:

TABLE A

| | % Chlorine Content | Structure (I) | (II) | (III) |
|---|---|---|---|---|
| PVC | 56.6 | 100 | 0 | 0 |
| CPVC | 57.5 | 97.2 | 2.8 | 0 |
| CPVC | 61.2 | 81.1 | 17.5 | 1.4 |
| CPVC | 63.2 | 71.1 | 26.8 | 2.1 |
| CPVC | 69.5 | 31.1 | 49.9 | 19.0 |
| CPVC | 72.6 | 5.5 | 60.5 | 34.0 |

On the basis of Table A, chlorinated PVC with a chlorine content of about 61% contains about 80% of structure I that corresponds to non post-chlorinated PVC, about 17% of structure II, and about 1% of structure III whereas at 72% chlorine content, chlorinated PVC contains about 5% of structure I, more than 60% of structure II, and more than 35% of structure III. Thus, there is no simple extrapolation of properties obtained in blends of PVC and CPE to blends of CPVC and CPE.

DIFFERENTIAL SCANNING CALORIMETRY

In the following table CPVC, tin stabilizer and chlorinated low molecular weight polyethylene was evaluated using differential scanning calorimetry method to confirm that two distinct phases exist for this blend:

| Sample | phr CPE | Tg CPE °C. | Tg CPVC °C. |
|---|---|---|---|
| CPE (35% Cl.) | neat | −12.9 | —* |
| CPVC 68.5% CL | — | — | 143.0 |
| CPVC 68.5% CL | 10 | −16.5 | 132.9 |
| CPVC 68.5% CL | 15 | −18.6 | 132.8 |
| CPVC 68.5% CL | 20 | −18.7 | 132.7 |
| CPVC 68.5% CL | 25 | −16.9 | 132.5 |

*no tin stabilizer present

By way of this method it is evident that with 68.5% chlorine CPVC a non-miscible two-phase blend exists with no shift in the glass transition temperature of either polymer beyond the plasticization effect of the tin stabilizer present.

Scanning electron microscopic observation of cross sections of extruded blends also confirms that at a discrete dispersed CPE domain exists and has a domain size of one micron and smaller. There are significant differences in extrudability observed across blends of CPVC/CPE with Varying molecular weights and chlorine levels of each. The varying quality of extrudate is unexplained by any general theory. It has also been observed that a specific blend may extrude well within a certain range of shear rate, for instance, 100–500 sec$^{-1}$ yet when one increases the output rate, the extrusion undergoes melt fracture, giving a rough surface appearance.

The prior art recognizes that chlorinated polyethylene can be combined with CPVC in small amounts less that 10 phr to obtain processing improvements. The art also teaches the combination of PVC and lower amounts of chlorinated polyethylene with a core/shell impact modifier to obtain impact strength with less loss in HDT.

The prior art recognizes the maximum impact strength improvement for CPVC with CPE containing 30–32% chlorine, and that good appearance and extrusion speed are obtained when the CPE is present at about 7 phr.

It has been observed that as the chlorine content of CPVC is increased, the extrusion processing window for combination with CPE changes considerably. The incidence of rough extrusion occurs with increasing frequency using a variety of differently chlorinated polyethylenes of varying molecular weight as one increases the chlorine content of CPVC.

While it would be desirable to utilize CPVC containing at least 65% by weight chlorine for its high HDT, the limited processing window with CPE presents a problem in obtaining smooth extrudates under varied processing shear conditions. The inclusion of conventional core/shell impact modifier with CPE, as suggested by Hankey for PVC, did not achieve an improvement in surface smoothness. Also, it was been observed that the appearance of extruded profiles from CPVC containing conventional core/shell impact modifier alone exhibits less desirable gloss and tactile characteristics.

Among the published art, there has been little disclosure of the use of CPE with CPVC for rigid profile extrusion of appearance articles such as window spacers, gaskets, glazing beads, window lineals, track lights, and the like. The designs used in commercial applications often require intricate cross-section shapes for profiles and the localized shear forces at the interface of the die and extrudate may vary widely as with the part geometry. Such rigid profiles having varied geometry formed in extruders under relatively high shear rates, exhibit more sensitivity towards melt fracture loss of shape and/or wariness.

It would thus be desirable to obtain the smooth extrudate surface and tactile characteristics under with high extrusion output rates. It would also be desirable to achieve high output rates for extruded profiles having any intricate cross-sectional shape while also maintaining dimensional stability and low percent die swell.

In a systematic study of immiscible but mechanically compatible CPVC/CPE blends, extrusions were obtained under varying processing conditions. With the use of rheological equations for Newtonian fluids the apparent viscosity of non-Newtonian rod shaped extrudate was used with quantified output to calculate the instantaneous shear rate of the extrudate independent of shape. The surface characteristics under each condition were visually rated and compared. The general equations used for a rod-shaped die, are:

$$S_D = 9.8 \times 10^{-3} Q/p\, r^3 \text{ and } P = 2.9 \times 10^{-5} S_D VL/r$$

wherein:

$S_D$=shear rate, $s^{-1}$

Q=flow rate, lb./hr.

p=melt density, g/cc r=radius, in inches

P=pressure, psi

L=land length, in inches and

V=viscosity in poise.

In studies with a small extruder equipped with a 0.046 inch rod die, under varying conditions, there were found particular combinations of CPVC and CPE types extruded under particular conditions that exhibited excellent appearance characteristics and low die swell.

SUMMARY OF THE INVENTION

An object of the present invention is to provide specified blends for rigid profile extrusion of appearance parts such as window spacers, glazing beads, window lineals, and track lights, having smooth surface characteristics. The object is achieved by a method of extruding blends in a specified range of shear rate generally from about 100 $sec^{-1}$ to about 4,000 $sec^{-1}$, the blends comprising 100 weight parts of CPVC having an I.V. of the precursor PVC of from about 0.4 to about 1.6, preferably 0.5 to 1.2 and most preferably from 0.7 to 1.0, and a CPVC chlorine content of from 62% to 72%, preferably greater than 65% up to 71%, in combination with from about 10 phr to about 30 phr of a single chlorinated polyethylene.

Another object of the invention is defined by a method of preparing an extruded profile from a blend comprising 100 weight parts CPVC containing from 62% to 72%, preferably greater than 65% up to 71% chlorine and 10 to 30 weight parts chlorinated polyethylene containing from 25% to 45% chlorine and extruding the blend in a specified range of shear rate depending on the specific CPVC and CPE present. The preferred embodiments of the invention are further defined by the particular combination wherein the chlorine content of CPVC, the real weight average molecular weight of CPE ($M_w$) and polydispersity ($M_w/M_n$), defined as the ratio of the weight average to number average molecular weight, and shear range are as follows for embodiments (a) through (m):

| CPVC Cl level | CPE $M_w$ × $10^3$ | CPE $M_w/M_n$ | Shear range ($S^{-1}$) |
|---|---|---|---|
| (a) 62%–64% | 90–130 | 4–8 | 100–600 |
| (b) 62%–64% | 150–200 | 3–8 | 100–500 |
| (c) 64.1%–66% | 90–130 | 4–8 | 100–4,000 |
| (d) 64.1%–66% | 170–220[1] | 6–9 | 100–500 |
| (e) 64.1%–66% | 170–210[2] | 8–11 | 100–550 |
| (f) 66.1%–69% | 90–130 | 4–8 | 100–4,000 |
| (g) 66.1%–69% | 150–200 | 3–8 | 100–1,300 |
| (h) 66.1%–69% | 290–330 | 8–14 | 100–650 |
| (i) 66.1%–69% | 170–220[1] | 6–11 | 100–1,800 |
| (j) 69.1%–72% | 90–130 | 4–8 | 100–3,500 |
| (j) 69.1%–72% | 150–200 | 3–8 | 100–1,000 |
| (k) 69.1%–72% | 290–330 | 8–14 | 100–500 |
| (l) 69.1%–72% | 170–220[1] | 6–9 | 100–3,500 |
| (m) 69.1%–72% | 170–210 | 8–11 | 100–2,300 |

[1]38%–44% chlorine content
[2]33–37% chlorine content

More preferred embodiments are specified by the following:

| CPVC Cl level | CPE $M_w$ × $10^3$ | CPE $M_w/M_n$ | Shear range ($S^{-1}$) |
|---|---|---|---|
| (a) 62%–64% | 90–130 | 4–8 | 300–600 |
| (b) 62%–64% | 150–200 | 3–8 | 400–500 |
| (c) 64.1%–66% | 90–130 | 4–8 | 350–4,000 |
| (d) 64.1%–66% | 170–220[1] | 6–9 | 400–500 |
| (e) 64.1%–66% | 170–210[2] | 8–11 | 350–550 |
| (f) 66.1%–69% | 90–130 | 4–8 | 400–4,000 |
| (g) 66.1%–69% | 150–200 | 3–8 | 400–1,300 |
| (h) 66.1%–69% | 290–330 | 8–14 | 500–650 |
| (i) 66.1%–69% | 170–220[1] | 6–11 | 400–1,800 |
| (j) 69.1%–72% | 90–130 | 4–8 | 350–3,500 |
| (j) 69.1%–72% | 150–200 | 3–8 | 300–1,000 |
| (k) 69.1%–72% | 290–330 | 8–14 | 350–500 |
| (l) 69.1%–72% | 170–220[1] | 6–9 | 500–3,500 |
| (m) 69.1%–72% | 170–210 | 8–11 | 400–2,300 |

[1]38%–44% chlorine content
[2]33–37% chlorine content

Still more preferred embodiment of (a) contains a chlorinated polyethylene having a real average molecular weight of from 115,000 to 125,000 and a polydispersity of from 5–7. The more preferred embodiment of (b) contains a chlorinated polyethylene having a real average molecular weight of from 175,000 to 195,000 and a polydispersity of from 5–6. The more preferred embodiment of (c) contains a chlorinated polyethylene having a real average molecular weight of from 115,000 to 125,000 and a polydispersity of from 5–7. The more preferred embodiment of (d) contains a chlorinated polyethylene having a real average molecular weight of from 190,000 to 205,000 and a polydispersity of 7–8.

DETAILED DESCRIPTION

Figure 1:
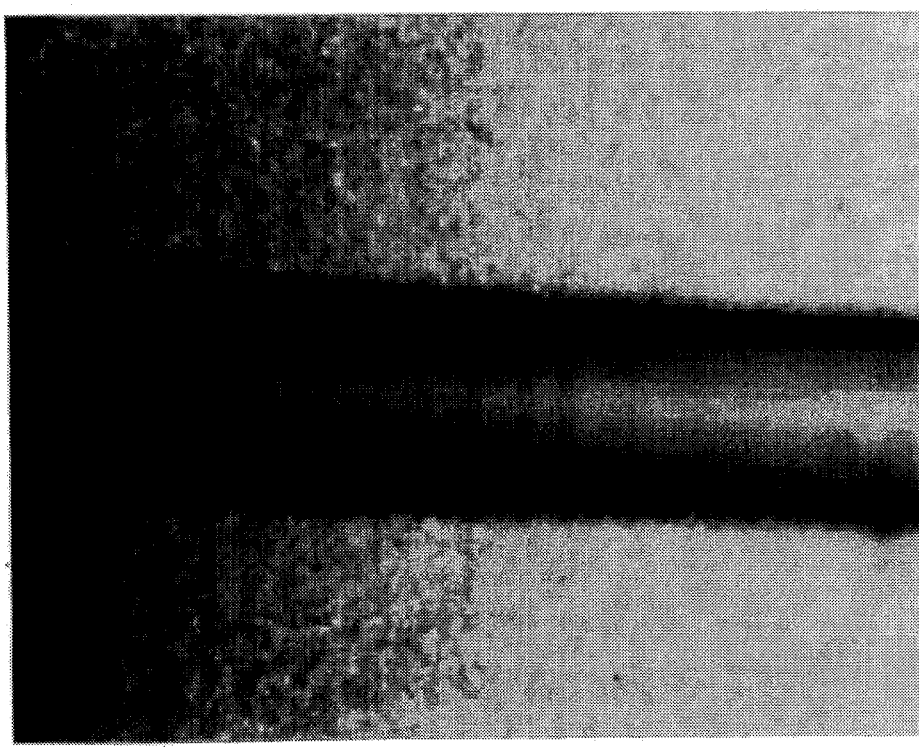
FIG. 1 is a photomicrograph at 15× magnification of a section of a 0.046 in. extruded rod which is representative of a very smooth surface appearance.

The rigid thermoplastic CPVC/CPE compounds specified herewith are defined as compositions having a modulus of elasticity, either in flexure or in tension, greater than 700 MPa (100,000 psi), and preferably greater than 1,400 MPa at 23° C. and 50% relative humidity when tested in accordance with ASTM Method D747, Test for Stiffness of Plastics by Means of a Cantilever Beam, ASTM Methods D790, Test for Flexural Properties of Plastics and Electrical Insulating Materials, ASTM Method D638, Test for Tensile Properties of Plastics, or ASTM Methods D882, Test for Tensile Properties of Thin Plastic Sheeting. As a semi-rigid extrudate, the compounds herein may exhibit a modulus of from 70 to 700 MPa (10,000 to 100,000 PSI). Rigid versions are most preferred.

The articles of manufacture are extruded profiles in any shape comprising CPVC as the major component and chlorinated polyethylene as the second component. There can be included preferably in minor amounts less than the weight of CPVC present, one or more other halopolymers selected from the group consisting of homopolymers and copolymers of: polyvinyl chloride, polyvinyl fluoride, polyvinylidene chloride, and polyvinylidene fluoride. These halopolymers enumerated above are commercially available from sources listed in *Chemical Week Buyers' Guide*, October-1990, Vol. 147 No. 18, New York. In addition, other halopolymer materials are described in detail in the following U.S. Patents: polyvinylidene fluoride—U.S. Pat. No. 4,585,701; polyvinyl chloride—U.S. Pat. No. 5,036,121; chlorinated polyethylene—U.S. Pat. Nos. 3,299,182 and 4,749,751; and polyvinylidene chloride—U.S. Pat. No. 4,362,834.

Post-chlorinated PVC is available commercially worldwide from a variety of sources including Atochem S.A., The B.F. Goodrich Co., Nippon Carbide Industries, Co., Ltd., and Tokuyama Sekisui Industry Co., Ltd.

Post-chlorinated PVC for use herein is preferably prepared by the post-chlorination of suspension polymerized PVC. Suspension polymerization techniques are well established in the art and set forth in the *Encyclopedia of PVC*, pp. 76–85 published by Marcel Decker, Inc. (1976) and need not be discussed in great detail here.

Chlorinated polyvinyl chloride is obtained by chlorinating homopolymers or copolymers containing less than 50% by weight of one or more copolymerizable comonomers. Suitable comonomers for vinyl chloride include acrylic and methacrylic acids; esters of acrylic and methacrylic acid, wherein the ester portion has from 1 to 12 carbon atoms, for example methyl-, ethyl-, butyl-, ethylhexyl acrylates and the like; methyl-, ethyl- , butyl methacrylates and the like; hydroxyalkyl esters of acrylic and methacrylic acid, for example hydroxymethyl acrylate, hydroxyethyl acrylate, hydroxyethyl methacrylate and the like; glycidyl esters of acrylic and methacrylic acid, for example glycidyl acrylate, glycidyl methacrylate and the like; alpha, beta-unsaturated dicarboxylic acids and their anhydrides, for example maleic acid, fumaric acid, itaconic acid and acid anhydrides of these, and the like; acrylamide and methacrylamide; acrylonitrile and methacrylonitrile; maleimides, for example, N-cyclohexyl maleimide; olefin, for example ethylene, propylene, isobutylene, hexene, and the like; vinylidene halide, for example, vinylidene chloride; vinyl ester, for example vinyl acetate; vinyl ether, for example methyl vinyl ether, allyl glycidyl ether, n-butyl vinyl ether and the like; crosslinking monomers, for example diallyl phthalate, ethylene glycol dimethacrylate, methylene bis-acrylamide, tracrylyl triazine, divinyl ether, allyl silanes and the like; and including mixtures of any of the above comonomers. Comonomers as well as crosslinking comonomers are preferably absent. That is, preferred are homopolymers and uncrosslinked CPVC polymers.

The molecular weight as measured by I.V., of precursor polyvinyl chloride for the post-chlorinated polymer will range from about 0.4 to about 1.6, preferably 0.5 to 1.2 and most preferredly from about 0.7 to 1.0 I.V. The inherent viscosity is a representative measure of the molecular weight of a polymer and is obtained in accordance with ASTM procedure No. D-1243-66. The choice of molecular weight is made by considering the shape and intricacy of the profile, the processing conditions and the physical property balance desired. If the molecular weight is too low, there may be insufficient melt strength and dimensional stability of the hot extrudate will suffer, and if the molecular weight is too high, the compound may not be processible under the desired conditions. Excellent results are obtained under a variety of conditions and cross-sectional shapes using an I.V. of the PVC precursor of about 0.85 to 0.95.

Chlorination of PVC can be carried out in any conventional manner as known to the art and to the literature to obtain a chlorinated base polymer having higher than 57 percent by weight chlorine up to about 74 percent by weight based upon the total weight of the polymer, however, in the practice of the invention, the use of a major amount of CPVC having a chlorine content of greater than 65% and up to 74% is preferred, and more preferably from 67% to about 71% chlorine.

The preferred method of post-chlorination is by the aqueous suspension chlorination method. There are considerations relative to this method wherein the preferred mode of chlorination employs a relatively concentrated aqueous suspension of the precursor PVC. The most preferred method results in a CPVC resin having a density which does not deviate more than about 20 percent from the mean density, and a surface area which does not deviate more than 30 percent from the mean surface area is more desirable. A concentration of about 15 to about 35 weight percent of solids in the suspension is preferred. Generally a concentration of the suspension higher than the specified range results in less uniform chlorinated product, while concentrations below 15 percent yield uniform product, but are not as economical. By "aqueous suspension" of PVC base polymer we refer to a slurry-like mixture of base polymer macrogranules suspended in water. This process is particularly directed to a batch process.

It is desired that oxygen be removed from the aqueous suspension before chlorination is initiated. This may be effected in any convenient manner, and assisted with agitation. Heating as may be required is preferably done after $Cl_2$ is sparged into suspension from a liquid $Cl_2$ cylinder until the pressure in the reactor reaches about 25 psig, at which point the suspension is saturated with $Cl_2$. It is preferred that this pressure be somewhat higher, that is in the range from about 35 psig to about 100 psig, to get the optimum results, though a pressure as low as 10 psig and higher than 100 psig may be employed. The amount of $Cl_2$ charged to the reactor is determined by weight loss in the $Cl_2$ cylinder. The reactor is preferably brought up to a "soak" temperature in the range from about 60° C. to about 75° C. at which soak temperature the suspension is maintained under agitation for a soak period in the range from about 1 minute to about 45 minutes. Excessive pressure adversely affects the porosity of the macrogranules to the detriment of the stability of the chlorinated product.

It is desirable to complete the chlorination reaction under photo-illumination, preferably with ultraviolet light, or the desired conversion of base polymer to chlorinated base polymer product does not occur. Chlorination proceeds at a rate which depends upon the pressure and temperature within the reactor, higher rates being favored at higher temperature and pressure. It is most preferred to adjust the soak temperature, the mass of resin, and the level of photo-illumination so that the temperature is "ramped" by the heat of reaction until it levels off at a finishing temperature of about 100° C. After chlorination has proceeded to the desired degree, the suspension is preferably not cooled but dumped to be centrifuged and the chlorinated polymer freed from the aqueous phase, after which HCl is removed from the product, preferably by neutralizing with an aqueous solution of an alkali metal hydroxide. The product is then washed with water to free the chlorinated polymer of residual alkali, and dried, all in a conventional manner, except that the temperatures at which the operations are carried out may be in the range from about 60° C. to about 100° C., which are higher than conventionally used.

Chlorinated polyethylene used herein has a specific gravity of from about 1.13 to 1.4, preferably about 1.16, a residual crystallinity of from about 0 to about 25%, preferably 0 to 10%, and a chlorine content from about 25% to about 45%, preferably 35% to 44%. The chlorination can be either homogeneous or heterogenous, preferably to a small extent. Surface appearance of extrudates depended on CPE molecular weight and polydispersity as measured by gel permeation chromatography and on the extrusion conditions used as illustrated below. Chlorination methods for CPE include aqueous suspension, solution, or gas phase methods, with the preferred method by way of suspension chlorination. CPE is commercially available from Dow Chemical Inc. The amount of CPE present ranges from about 10 to about 30 phr, preferably from about 12 to about to 25 phr, still more preferred are levels from 15 to 25 phr. The particular combination of CPVC and CPE within the scope of the present invention will be described below.

The core/shell type impact modifiers can be present but are preferably absent. These include acrylonitrile butadiene styrene terpolymers (ABS), methacrylate, acrylonitrile, butadiene, styrene (MABS) polymers and methacrylate butadiene styrene polymer (MBS). Other impact modifiers are disclosed in *Plastics Compounding*, Nov./Dec., 1983: "Update: Impact Modifiers for Rigid PVC," by Mary C. McMurrer. Various commercial MBS grades include Paraloid® KM-653, BTA-733 from Rohm and Haas, or Kanegafuchi Inc. B-56 and B-22; Commercial polyacrylate impact modifiers include KM®-323B, and KM®-330, from Rohm and Haas, Inc.; ABS grades are commercially available from GE Plastics, Inc, for example, Blendex® 336.

Thermal stabilizers are employed in the compounds herein and can be selected from various organic compounds, for example dibutyltin-S-S'-bi-(isooctylmercaptoacetate), dibutyl tin dilaurate, dibutyltin di-2-ethylhexyl thioglycolate dimethyl tin diisooctyl-thioglycolate, and the like. Tin compounds are generally used at from 1 to 5 phr, preferably about 2.0 to 4.0 phr.

Secondary stabilizers may be included, if desired, but are not necessary. Examples of secondary stabilizers include metal salt of phosphoric acid, polyols, epoxidized oils, and acid acceptors which are not detrimental to the base CPVC resin used. The secondary stabilizers can be used by themselves or in any combination as desired. Specific examples of metal salts of phosphoric acid include water-soluble, alkali metal phosphate salts, disodium hydrogen phosphate, orthophosphates such as mono-, di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Examples of possible acid acceptors include potassium citrate, aluminum magnesium hydroxy carbonate hydrate, magnesium aluminum silicates and alkali metal alumino silicates. An example of commercially available aluminum magnesium hydroxy carbonate hydrate is Hysafe 510, available from the J. M. Huber Company. Examples of magnesium aluminum silicates are molecular sieves such as for example Molsiv Adsorbent Type 4A from UOP. Examples of alkali metal alumino silicates are zeolites such as CBV 10A Zeolite Na-Mordenite by Synthetic Products Co. The most preferred secondary stabilizer is disodium hydrogen phosphate (DSP) and is used by treating the CPVC resin. Typical levels of secondary stabilizers can range from about 0.1 wt. parts to about 7.0 wt. parts per 100 wt. parts halopolymer (phr).

In addition, commercially available antioxidants are used such as phenolics, BHT, BHA, various hindered phenols and various inhibitors like substituted benzophenones.

Other auxiliary components are contemplated. Antistats may be used and are commercially available under the Glycolube® trademark of Lonza Corp. Exemplary lubricants are the various hydrocarbons, such as paraffins, paraffin oils, low molecular weight polyethylene, oxidized polyethylenes, fatty acids and their salts such as stearic acid and calcium stearate, fatty alcohols such as cetyl, stearyl, or octadecyl alcohol; metal soaps such as calcium or zinc salts of oleic acid; fatty amides of organic acids such as stearamide, ethylene-bis-stearamide; preferred fatty esters and partial esters such as butyl stearate, polyol esters such as glycerol monostearate, hexaglycerol distearate; and fatty ester waxes such as stearyl esters. The most preferred lubricant is oxidized polyethylene. Henkel Co. produces a variety of preferred fatty ester formulations under the Loxiol® mark. Combinations of internal and external lubricants may also be used. Lubrication of the halopolymer compounds of the present invention is a complex art. Since several lubricants can be combined in countless variations, the total amount of lubricant may vary generally from about 2 to 10 phr, preferably from 2 to about 6 phr. Optimization of particular individual lubricant formulations is beyond the scope of the present invention, and can be achieved as one skilled in the art prefers.

Adjustment of melt viscosity can be achieved as well as increasing melt strength by optionally employing commercial acrylic process aids such as those from Rohm and Haas under the Paraloid® Trademark, for example Paraloid® K-120ND, K-120N, K-175.

Exemplary fillers are optional and include clay, wollastonite, mica, barytes, calcium carbonate and silica including precipitated silicas, silica gels, metallic silicates, pyrogenic or fumed silicas and the like. These have the general formulae: $SiO_2$, $M_n(SiO_3)_x$.

The values of n and x can vary with the oxidation state of the metal associated with the $SiO_3$ ion. The values n and x are usually integers from about 1 to about 4.

Preferred pigments are the various titanium dioxides ($TiO_2$) and carbon blacks which are commercially available. Preferred $TiO_2$ types are coated or uncoated, rutile titanium dioxide powder. An exemplary commercial grade is Ti-Pure® R-100 from E.I. DuPont De Nemours and Co. Inc. (DuPont). If used, pigments such as $TiO_2$ are present in an amount ranging from 1 to 25 phr, more typically 3 to 15 phr, and most typically from 3 to about 8 phr. Optional coloring pigments can be used.

The method of compounding is straightforward as any high intensity method to uniformly mix and fuse the components into a homogeneous compound such as with a Banbury/mill, followed by sheeting, slitting or extrusion into pellets, or cubes. The differences in process handling of CPVC compared with polyvinyl chloride-based compounds relate mainly to the temperature and viscosity differences and care must be taken to avoid too much work and shear burning. In the preparation of compounds, the components can be combined and mixed with a Banbury and milled on a heated roll mill. The fused compound can be extruded and chopped into cubes. Alternatively, the components can be combined in a compounding twin screw extruder. The compounds are extruded into final form at conventional stock temperatures from about 175° C. to about 235° C., and preferably from about 200° C. to about 225° C.

The extruder characteristics applicable to melt processing of the compounds of the present invention include:

Head pressure rating of at least 7500 psi (51.7 MPa).

Extruder drive/gearbox capable of generating high torque at low rpm.

Vacuum venting to remove volatile components, moisture and entrapped air.

A barrel L/D of at least 16/1 for twin screw; generally at least 20/1 for single screw.

Temperature controllers able to control within 5° F. or preferably +/–2° F..

Accurately controllable powder metering screw for powder compounds.

A ramped barrel temperature profile is advisable with a zone nearest the hopper set at 180° C. and the zone nearest the die at about 195° C. for 0.75 inch diameter screw. There can be used calibrating blocks at the exit end to assist in proper dimension sizing as the hot profile is cooled. Air streams can be used to improve heat loss, and for more close tolerances, vacuum water sizing devices can be used. The extent to which one chooses to employ calibrator blocks and air or water sizing will depend on dimension tolerances for the particular profile shape, the intended output volume of any one profile article and the number of different profiles made with a particular production set. These considerations are beyond the scope of the disclosure.

EXAMPLES

In the examples below, compounds were prepared as listed below. The components were combined in a Banbury/mill and extruded in a Brabender extruder equipped with a 0.046 inch rod die. The extrusion conditions were controlled by varying the rpm from 5 to 50 rpm. The actual shear rates were calculated for each example using quantitative extrusion volume output rates. For each rpm series the calculated shear rates were grouped as follows:

| SCREW RPM | SHEAR RANGE |
|---|---|
| 5 | 400–500 |
| 10 | 800–1000 |
| 15 | 1000–1300 |
| 20 | 1200–1800 |
| 25 | 1500–2200 |
| 30 | 1700–3300 |
| 40 | 2200–3300 |
| 50 | 2700–4100 |

The compounds used in the examples contained one of the following CPVC resins, all of which were treated with 1.2 parts the secondary stabilizer disodium hydrogen phosphate per 100 parts of CPVC resin.

| Resin No. | Resin Chlorine Content, % | Resin I.V. | Wt. Amount |
|---|---|---|---|
| 1 | 63.1 | 0.92 | 100 |
| 2 | 65.2 | 0.92 | 100 |
| 3 | 68.3 | 0.92 | 100 |
| 4 | 70.3 | 0.92 | 100 |

The examples contained either of the following components:

| No. | Type | Wt. PHR | Real AVE. MW[2] | $M_w/M_n$ | % Chlorine |
|---|---|---|---|---|---|
| A | CPE | 20 | 120,000 | 5.7 | 36 |
| B | CPE | 20 | 188,000 | 6.6 | 36 |
| C | CPE | 20 | 317,000 | 11.6 | 36 |
| D | CPE | 20 | 197,000 | 7.4 | 42 |
| E | CPE | 20 | 192,000 | 9.5 | 35 |
| F[x] | CPE | 20 | 180,000 | — | 25 |
| G[x] | CPE | 20 | 180,000 | — | 40 |
| H | Acrylic | 20 | — | — | — |
| I | MBS | 20 | — | — | — |

[x]estimated
[2]Real weight average and number average molecular weight were measured by Waters 150CV gel permeation chromatograph equipped with refractometer detector and a capillary viscometer. Approximately 0.03 mg of samples were dissolved in 10 ml trichlorobenzene stabilized with 250 ppm BHT. The samples were filtered through Gelman Acrodisc CR PTFE 0.45 μm filter. The samples were heated to 130° C. and allowed to stand at least 90 minutes before measurement under the following conditions.
Column set: PLgel 10 μm, 1 guard column + 3 mixed bed columns + a 100Å column.
Mobile phase: Trichlorobenzene
Flow rate: 1.0 ml/minute
Temperature: 135° C.
Sample size: 200 μl @ ca. 0.3%
Intensities: 64 × 8

The following formulation was used in evaluating extrudates:

| Component | Amount |
|---|---|
| CPVC | 100 |
| Component (A-J) | 20 |
| Dibutyltin-S-S'-bi-(isooctylmercaptoacetate) | 2.25 |
| Oxidized polyethylene | 1.5 |
| Glycerol ester | 1.0 |
| Antioxidant | 0.25 |
| $TiO_2$ | 5.0 |
| Carbon black | 0.25 |

The Brabender extruder barrel zones were maintained at the following temperatures (°C.):

| Zone 1 | Zone 2 | Zone 3 | Die |
|---|---|---|---|
| 180 | 185 | 190 | 195 |

Percent die swell measurements were taken by comparing the actual diameter of the extrudate after cooling and the die diameter. The following results were reported as (extrudate dia. - die dia.)/die dia.×100.

| | % DIE SWELL RPM | | | | | | | |
|---|---|---|---|---|---|---|---|---|
| EXAMPLE | 5 | 10 | 15 | 20 | 25 | 30 | 40 | 50 |
| 1-A | 41 | 35 | 30 | 39 | 43 | 46 | 48 | 50 |
| 1-B | 39 | 41 | 41 | 43 | 46 | 46 | 43 | 43 |
| 1-C | 57 | 48 | 48 | 48 | 52 | 50 | 52 | 50 |
| 1-D | 61 | 54 | 50 | 55 | 74 | 57 | 54 | Fail* |
| 1-E | 52 | 48 | 50 | 55 | 40 | 57 | 59 | Fail* |
| 1-F | 50 | 43 | 46 | 44 | 96 | 49 | 50 | 50 |
| 1-G | 70 | 59 | 54 | 55 | 97 | 59 | 61 | Fail* |
| 1-H | 33 | 33 | 33 | 33 | 77 | 39 | 39 | 39 |
| 1-I | 35 | 37 | 37 | 33 | 99 | 37 | 35 | 33 |

*too irregular to measure - Lumpy flow

Example 1-A exhibits a desirable reduced level of swell.

| | % DIE SWELL RPM | | | | | | | |
|---|---|---|---|---|---|---|---|---|
| EXAMPLE | 5 | 10 | 15 | 20 | 25 | 30 | 40 | 50 |
| 2-A | 33 | 33 | 33 | 37 | 39 | 41 | 48 | 50 |
| 2-B | 39 | 39 | 39 | 41 | 43 | 46 | 58 | 48 |
| 2-C | 43 | 43 | 48 | 50 | 57 | 57 | 57 | 59 |
| 2-D | 52 | 52 | 54 | 57 | 62 | 61 | 65 | 65 |
| 2-E | 46 | 46 | 48 | 50 | 54 | 59 | 61 | 61 |
| 2-F | 37 | 35 | 37 | 39 | 41 | 46 | 48 | 50 |
| 2-G | 54 | 52 | 52 | 57 | 57 | 61 | 63 | 65 |
| 2-H | 33 | 37 | 43 | 50 | 54 | 59 | 61 | 59 |
| 2-I | 33 | 35 | 43 | 48 | 54 | 52 | 52 | 50 |

| | % DIE SWELL RPM | | | | | | | |
|---|---|---|---|---|---|---|---|---|
| EXAMPLE | 5 | 10 | 15 | 20 | 25 | 30 | 40 | 50 |
| 3-A | 28 | 28 | 28 | 30 | 33 | 35 | 37 | 41 |
| 3-B | 37 | 35 | 35 | 37 | 41 | 43 | 46 | 48 |
| 3-C | 46 | 50 | 48 | 50 | 50 | 52 | 57 | 59 |
| 3-D | 50 | 57 | 54 | 54 | 54 | 57 | 59 | 63 |
| 3-E | 41 | 41 | 41 | 41 | 46 | 48 | 54 | 57 |
| 3-F | 28 | 30 | 30 | 30 | 35 | 37 | 41 | 46 |
| 3-G | 48 | 52 | 50 | 52 | 52 | 54 | 61 | 67 |
| 3-H | 43 | 67 | 80 | 87 | 91 | 91 | 96 | 93 |
| 3-I | 57 | 61 | 63 | 65 | 67 | 70 | 67 | 63 |

| | % DIE SWELL RPM | | | | | | | |
|---|---|---|---|---|---|---|---|---|
| EXAMPLE | 5 | 10 | 15 | 20 | 25 | 30 | 40 | 50 |
| 4-A | 43 | 37 | 26 | 26 | 26 | 24 | 26 | 30 |
| 4-B | 33 | 30 | 28 | 30 | 30 | 33 | 41 | 43 |
| 4-C | 41 | 41 | 39 | 37 | 39 | 39 | 41 | 46 |
| 4-D | 48 | 48 | 43 | 41 | 41 | 43 | 46 | 50 |
| 4-E | 50 | 50 | 46 | 46 | 41 | 37 | 41 | 43 |
| 4-F | 28 | 24 | 24 | 26 | 26 | 28 | 30 | 35 |
| 4-G | 46 | 41 | 37 | 39 | 39 | 39 | 43 | 46 |
| 4-H | 65 | 76 | 78 | 78 | 80 | 83 | 89 | 89 |
| 4-I | 59 | 57 | 54 | 57 | 59 | 65 | 65 | 70 |

It can be seen from the above die swell measurements taken at the indicated RPM, among resin series 1 through 4, that the degree of die swell varies widely as between CPE resins of different chlorine content as well as molecular weight. However it is observed that die swell is comparatively less among the examples exhibiting the best surface smoothness.

The following actual shear rates were calculated:

| | SHEAR RATE, SEC$^{-1}$ RPM | | | | | | | |
|---|---|---|---|---|---|---|---|---|
| EX. | 5 | 10 | 15 | 20 | 25 | 30 | 40 | 50 |
| 1-A | 409 | 754 | 1084 | 1373 | 1685 | 2034 | 2647 | 3237 |
| 1-B | 396 | 718 | 1072 | 1406 | 1735 | 1982 | 2694 | 3278 |
| 1-C | 405 | 768 | 1114 | 1390 | 1719 | 2017 | 2577 | 3169 |
| 1-D | 466 | 791 | 1254 | 1574 | 1983 | 2357 | 2964 | 3379* |
| 1-E | 440 | 779 | 1105 | 1407 | 1668 | 1983 | 2552 | 3161 |
| 1-F | 367 | 626 | 994 | 1243 | 1478 | 1679 | 2230 | 2955 |
| 1-G | 386 | 719 | 1004 | 1327 | 1621 | 1940 | 2640 | 3288* |
| 1-H | 388 | 782 | 1112 | 1542 | 1844 | 2267 | 2877 | 3709 |
| 1-I | 364 | 739 | 1088 | 1420 | 1785 | 2092 | 2754 | 3359 |

| | % SHEAR RATE, SEC$^{-1}$ RPM | | | | | | | |
|---|---|---|---|---|---|---|---|---|
| EX. | 5 | 10 | 15 | 20 | 25 | 30 | 40 | 50 |
| 2-A | 382 | 727 | 1007 | 1320 | 1642 | 1976 | 2558 | 3204 |
| 2-B | 386 | 691 | 1010 | 1365 | 1650 | 1987 | 2710 | 3255 |
| 2-C | 399 | 723 | 1095 | 1477 | 1780 | 2085 | 2658! | 3271! |
| 2-D | 452 | 784 | 1227 | 1598 | 1987 | 2355 | 3106 | 3709! |
| 2-E | 417 | 786 | 1165 | 1482 | 1813 | 2126 | 2661 | 2314 |
| 2-F | 349 | 625 | 937 | 1173 | 1436 | 1673 | 2225 | 2784 |
| 2-G | 414 | 766 | 1153 | 1480 | 1786 | 2062 | 2665! | 3346! |
| 2-H | 468 | 774 | 1188 | 1605 | 1943 | 2404 | 3173 | 4047 |
| 2-I | 381 | 726 | 1093 | 1539 | 1905 | 2294 | 2937 | 3647 |

| | % SHEAR RATE, SEC$^{-1}$ RPM | | | | | | | |
|---|---|---|---|---|---|---|---|---|
| EX. | 5 | 10 | 15 | 20 | 25 | 30 | 40 | 50 |
| 3-A | 486 | 772 | 1129 | 1421 | 1792 | 2060 | 2654 | 3211 |
| 3-B | 450 | 807 | 1158 | 1430 | 1728 | 2048 | 2287 | 43294 |
| 3-C | 539 | 867 | 1266 | 1569 | 1840 | 2175 | 2711 | 3478 |
| 3-D | 487 | 994 | 1428 | 1739 | 2144 | 2497 | 3008 | 3717 |
| 3-E | 487 | 878 | 1202 | 1510 | 1823 | 2103 | 2638 | 3342 |
| 3-F | 354 | 676 | 977 | 1219 | 1531 | 1735 | 2196 | 2598 |
| 3-G | 476 | 896 | 1248 | 1590 | 1901 | 2192 | 2788 | 3496 |
| 3-H | 443 | 767 | 1220 | 1673 | 2097 | 2451 | 3231 | 3971 |
| 3-I | 391 | 795 | 1174 | 1570 | 1901 | 2270 | 2889 | 3480 |

| | % SHEAR RATE, SEC$^{-1}$ RPM | | | | | | | |
|---|---|---|---|---|---|---|---|---|
| EX. | 5 | 10 | 15 | 20 | 25 | 30 | 40 | 50 |
| 4-A | 409 | 573 | 855 | 1433 | 1713 | 2019 | 2690 | 3321 |
| 4-B | 440 | 826 | 1208 | 1533 | 1867 | 2173 | 2819 | 3424 |
| 4-C | 513 | 966 | 1357 | 1769 | 2149 | 2463 | 2991 | 3683 |
| 4-D | 535 | 914 | 1365 | 1818 | 2260 | 2687 | 3338 | 4117 |
| 4-E | 482 | 958 | 1299 | 1626 | 1906 | 2184 | 2821 | 3480 |
| 4-F | 389 | 738 | 967 | 1234 | 1499 | 1762 | 2236 | 2719 |
| 4-G | 519 | 1000 | 1349 | 1677 | 1930 | 2228 | 2884 | 3511 |
| 4-H | 453@ | 910* | 1297' | 1652' | 2083' | 2427' | 3233' | 4120' |
| 4-I | 374 | 747 | 1078 | 1348 | 1654 | 2004 | 2697 | 3293 |

@ — Slightly Lumpy; * — Lumpy; ' — Very Lumpy; ! — Fail; ̂ — Slightly Spiral

BRABENDER TORQUE

The equilibrium torque for the above series of compounds was evaluated in a Haake Rheomix Model No. 600 under the following conditions:

| | |
|---|---|
| Mixing Bowl Temp °C. | 210 |
| RPM | 35 |
| Sample Weight | 65 gms. |

3 minute load and heat soak at 10 rpm before testing.

The following table lists the torque reading under controlled conditions and each compound can be compared. The general trends show that torque is directly proportional to CPVC chlorine content and the average molecular weight of the impact modifier. The MBS impact modifier exhibited the highest torque while CPE-A exhibited the lowest torque.

| | BRABENDER TORQUE (m-g) | | | |
|---|---|---|---|---|
| ADDITIVE | CPVC TYPE | | | |
| TYPE | 1 | 2 | 3 | 4 |
| A | 1230 | 1500 | 1540 | 1690 |
| B | 1530 | 1800 | 2000 | 2030 |
| C | 1570 | 1780 | 2080 | 2070 |
| D | 1480 | 1650 | 1980 | 1920 |
| E | 1420 | 1600 | 1820 | 1910 |
| F | 1640 | 1700 | 2000 | 1970 |
| G | 1620 | 1690 | 2000 | 2070 |
| H | 1590 | 1880 | 2220 | 2500 |
| I | 2000 | 2220 | 2680 | 2920 |

SURFACE APPEARANCE

Figure 2:
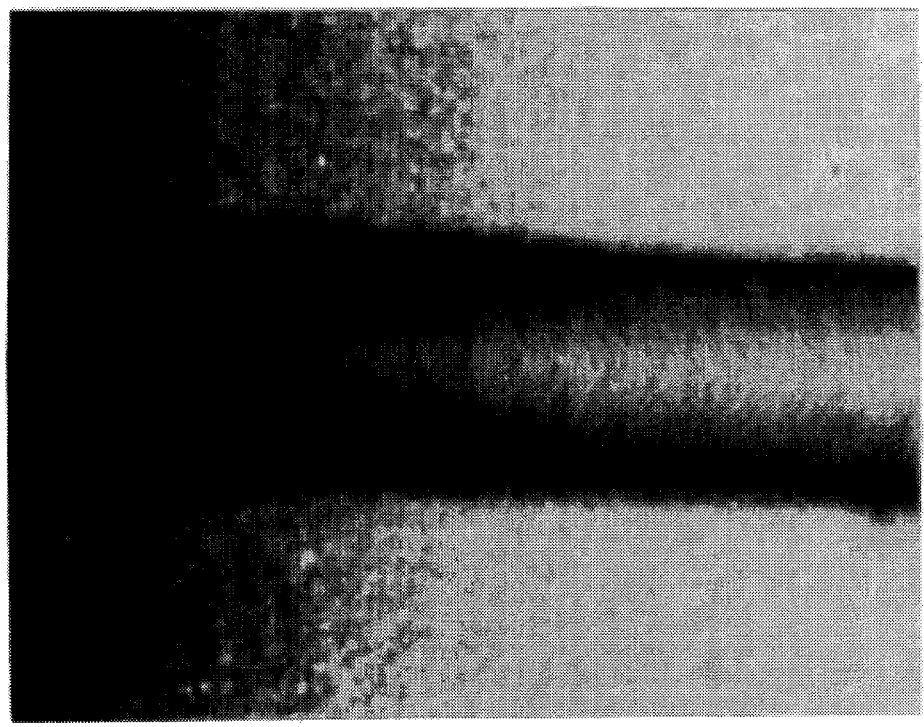
FIG. 2 is a photomicrograph at 15× magnification of a section of a 0.046 in. extruded rod which is representative a smooth surface appearance.
Figure 3:
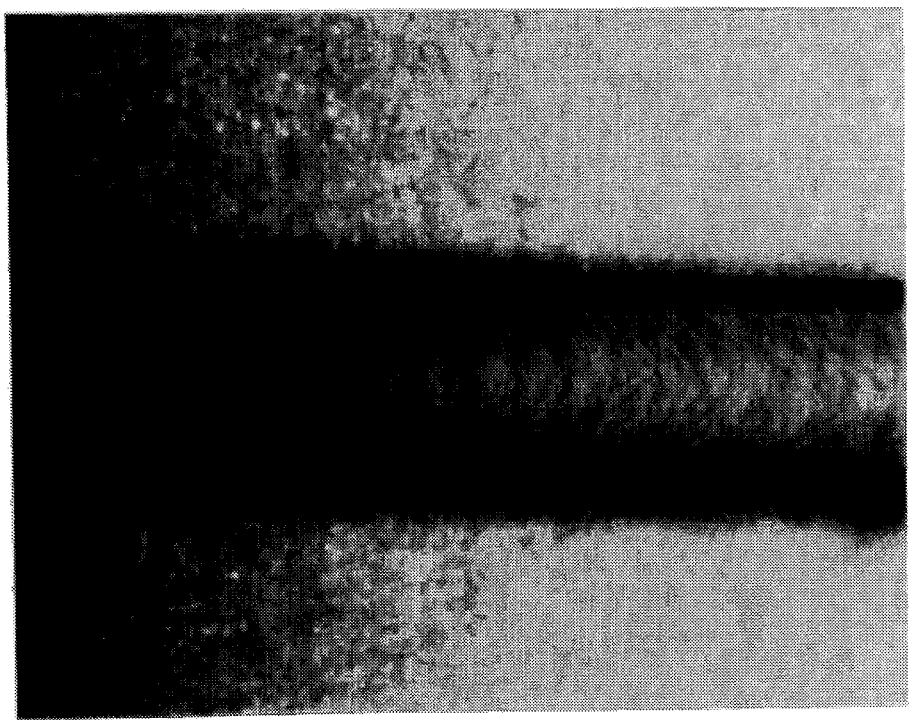
FIG. 3 is a photomicrograph at 15× magnification of a section of a 0.046 in. extruded rod which is representative of a semi-smooth surface appearance.
Figure 4:
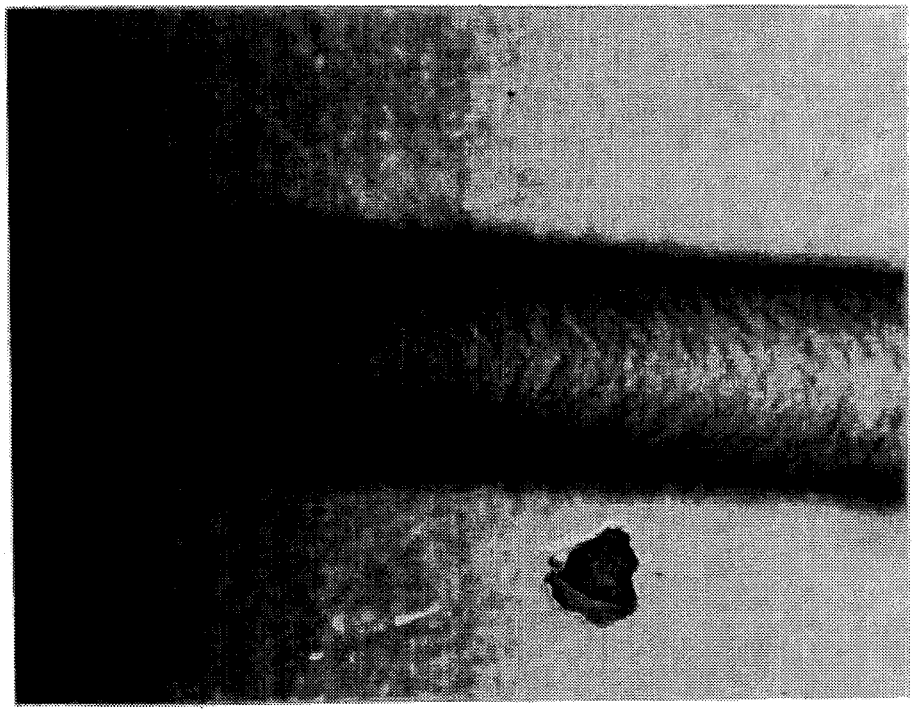
FIG. 4 is a photomicrograph at 15× magnification of a section of a 0.046 in. extruded rod which is representative a slightly rough surface appearance.
Figure 5:
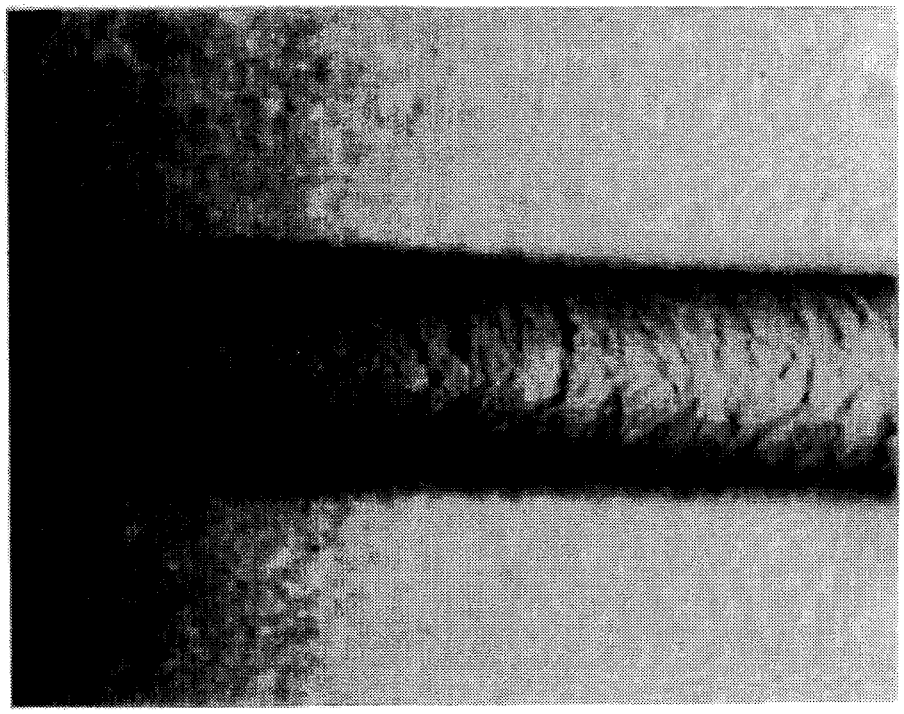
FIG. 5 is a photomicrograph at 15× magnification of a section of a 0.046 in. extruded rod which is representative a rough surface appearance.
Figure 6:
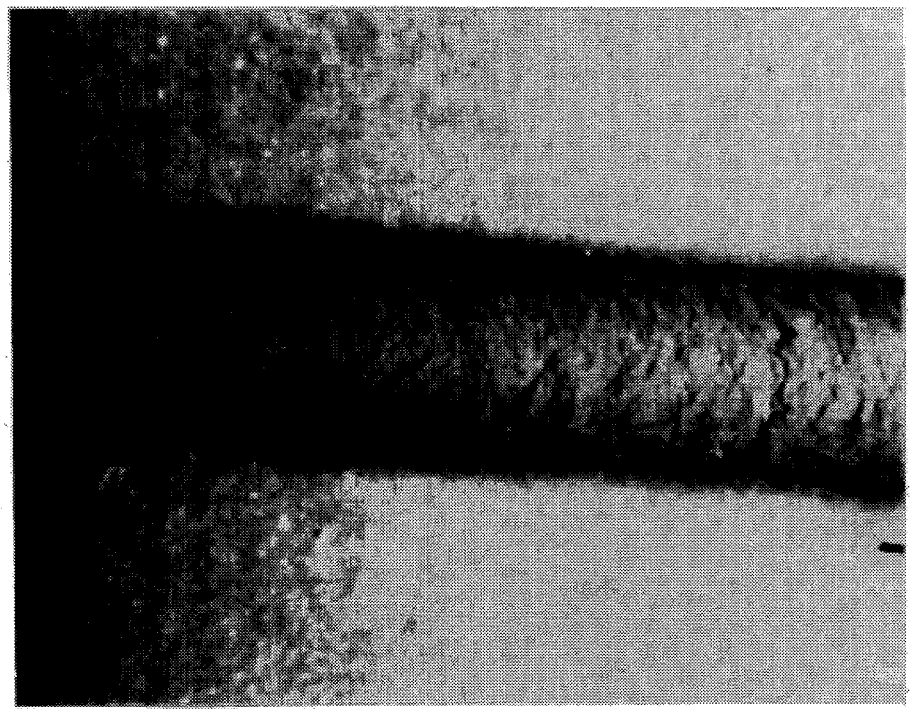
FIG. 6 is a photomicrograph at 15× magnification of a section of a 0.046 in. extruded rod which is representative a very rough surface appearance.

Series 1–4 with additives A–I were extruded with the aforementioned single screw extruder equipped with a 0.046 in. circular die. Each example was compared to an established appearance criteria using six categories and illustrated in FIGS. 1–4 for the standards. The figures show photomicrographs made at 15× magnification of rods which were representative of each appearance classification category. The categories are as follows:

SMOOTH RODS
1. Very smooth/silky feeling rods with no texture visible.
2. Smooth feeling rods with a slight texture visible.
3. Smooth feeling rods with some texture visible.

ROUGH RODS
1. Some texture can be felt and seen.
2. Rough to the touch and lots of visible texture.
3. Very rough to the touch and extremely coarse texture seen.

In a preferred embodiment, CPVC resin is used which has been pre-treated with a phosphate salt. The following compounds illustrate the significant improvement with the use of this type of resin for improving the processing stability.

| Component | Example A | Example B |
|---|---|---|
| Untreated CPVC | 100 (parts) | — |
| DSP treated CPVC | — | 100 |
| Tin stabilizer | 2.25 | 2.25 |
| Chlorinated PE | 20 | 20 |
| lubricant | 2.5 | 2.5 |
| $TiO_2$ | 5 | 5 |
| Antioxidant | 0.25 | 0.25 |
| Brabender stability (minutes) | 6.5 | 13.7 |
| Torque (m-g) | 2100 | 1800 |
| Temperature (°C.) | 222 | 225 |

Table A below represents the extrusion appearance ratings of the compound containing CPVC with a chlorine content of 63.1; Table B illustrates the appearance of extrudate from compounds made with a 65.2% chlorine level; Table C illustrates the appearance of extrudate from compounds made with 68.3% chlorine level, and table D illustrates the appearance of extrudates from compounds made with 70.3% chlorine CPVC. The preferred embodiments are made with a CPVC containing from 67 to 72% chlorine, with the most preferred CPVC contains from 67% to 70% chlorine. The most preferred chlorinated polyethylene contains from 35% to 37% chlorine and has a real weight average molecular weight of from 90,000 to 130,000, more preferably 115,000 to 125,000 and most preferably about 120,000, with a polydispersity of from 5 to 7 as in CPE number A above.

In the following series of examples, compounds were prepared as listed below with and without a secondary stabilizer. The components were combined in a Banbury/mill and extruded in a Brabender extruder with a 0.046 inch rod die. The extrusion conditions were controlled by varying the rpm from 10 to 50 rpm, as described above. The following formulation was used in evaluating the extrudates:

| Component | Amount |
|---|---|
| CPVC, 68.3% Cl, 0.92 I.V. | 100 |
| CPE (Real Ave. M.W. 188,000; Polydispersity 5.7, 364 Cl) | 20 |
| Dibutyltin-S-S'-bi-(isooctylmercaptoacetate) | 2.25 |
| Oxidized Polyethylene | 1.5 |
| Glycerol Ester | 1.0 |
| Antioxidant | 0.25 |
| Titanium dioxide | 5.0 |

In addition, the above listed formulations were formulated either without a secondary stabilizer or with a secondary stabilizer as listed below.

| Number | Type | Amount |
|---|---|---|
| A | None | None |
| B | Disodium Phosphate, Treated CPVC Resin | 1.2 |
| C | Potassium Citrate, Treated CPVC Resin | 1.2 |
| D | Hysafe 510 | 1.2 |
| E | Molecular Sieve 4a or 10× | 1.2 |
| F | CBV 10a Zeolite | 1.2 |

Each of the extruded examples was compared to an established appearance criteria using five categories. The categories are as follows:

Very smooth/high char- very smooth feeling surface containing a large quantity of char;
Very smooth/char- very smooth feeling surface containing a fair level of char particles;
Very smooth/slight char- very smooth feeling surface containing only some char particles;
Very smooth/very slight char- very smooth feeling surface with faint traces of char;
Very smooth/no char- very smooth feeling surfaces with no degraded polymer.

Table E below represents the extrusion appearance rating of the compound formulations with and without secondary stabilizers as described above. As is evident from these examples, using a secondary stabilizer in conjunction with the formulation is preferred. Preferably, disodium phosphate, potassium citrate or aluminum magnesium hydroxy carbonate hydrates are used.

Table F below sets forth the Brabender stability as described previously for the samples in this series of experiments with and without a secondary stabilizer.

TABLE A

|     | 5 rpm | 10 rpm | 15 rpm | 20 rpm | 25 rpm | 30 rpm | 40 rpm | 50 rpm |
|-----|-------|--------|--------|--------|--------|--------|--------|--------|
| 1-A | semi smooth | sl. rough | sl. rough | semi smooth | sl. rough | sl. rough lumpy | sl. rough lumpy | sl. rough lumpy |
| 1-B | very rough | very rough | very rough | very rough | very rough | very rough | very rough | very rough |
| 1-C | rough | very rough | very rough | very rough | very rough | very rough | very rough | very rough lumpy |
| 1-D | semi smooth | sl. rough | rough | rough | rough | rough | rough | very rough lumpy |
| 1-E | very rough | very rough | very rough | very rough | very rough | very rough | very rough lumpy | very rough lumpy |
| 1-F | rough | very rough | very rough | very rough | very rough | very rough | very rough | very rough lumpy |
| 1-G | rough lumpy | sl. rough | very rough | very rough | very rough | very rough | very rough lumpy | very rough wavy |
| 1-H | smooth | smooth | smooth | smooth | smooth | smooth | smooth | smooth |
| 1-I | smooth | very rough lumpy | very rough lumpy | smooth | smooth | smooth | very smooth | smooth |

TABLE B

|     | 5 rpm | 10 rpm | 15 rpm | 20 rpm | 25 rpm | 30 rpm | 40 rpm | 50 rpm |
|-----|-------|--------|--------|--------|--------|--------|--------|--------|
| 2-A | smooth | smooth | smooth | smooth | smooth | smooth | smooth | smooth |
| 2-B | very rough | very rough | very rough | rough | rough | rough | rough | rough |
| 2-C | very rough | very rough | very rough | very rough | very rough | very rough | very rough wavy | rough wavy |
| 2-D | very smooth | sl. rough | rough | rough | rough | rough | sl. rough | sl. rough wavy |
| 2-E | smooth | rough | very rough | very rough | very rough | rough | rough | rough |
| 2-F | semi smooth | very rough | very rough | very rough | very rough | very rough | rough | rough |
| 2-G | smooth | sl. rough | rough | very rough | very rough | very rough | rough wavy | rough wavy |
| 2-H | very smooth | very smooth | very smooth | very smooth | very smooth | smooth | semi smooth | sl. rough |
| 2-I | very smooth | very smooth | very smooth | very smooth | very smooth | very smooth | very smooth | very smooth |

TABLE C

|     | 5 rpm | 10 rpm | 15 rpm | 20 rpm | 25 rpm | 30 rpm | 40 rpm | 50 rpm |
|-----|-------|--------|--------|--------|--------|--------|--------|--------|
| 3-A | very smooth | very smooth | very smooth | very smooth | very smooth | very smooth | very smooth | very smooth |
| 3-B | semi smooth | smooth | semi smooth | sl. rough | sl. rough | sl. rough | rough | sl. rough |
| 3-C | smooth | rough | rough | very rough | very rough | very rough | rough | rough |
| 3-D | very smooth | smooth | semi smooth | semi smooth | sl. rough | sl. rough | sl. rough | sl. rough |
| 3-E | smooth | smooth | sl. | sl. | sl. | rough | rough | rough |

TABLE C-continued

| | 5 rpm | 10 rpm | 15 rpm | 20 rpm | 25 rpm | 30 rpm | 40 rpm | 50 rpm |
|---|---|---|---|---|---|---|---|---|
| 3-F | very smooth | very rough | rough very rough | rough very rough | rough very rough | very rough | very rough | very rough |
| 3-G | smooth | semi smooth | semi smooth | sl. rough | sl. rough | sl. rough | sl. rough | sl. rough lumpy |
| 3-H | semi smooth | sl. rough | rough | very rough lumpy | very rough lumpy | very rough lumpy | very rough lumpy | very rough lumpy |
| 3-I | very smooth | very smooth | very smooth | very smooth | very smooth | very smooth | sl. rough lumpy | sl. rough lumpy |

TABLE D

| | 5 rpm | 10 rpm | 15 rpm | 20 rpm | 25 rpm | 30 rpm | 40 rpm | 50 rpm |
|---|---|---|---|---|---|---|---|---|
| 4-A | semi-smooth | smooth | very smooth | very smooth | very smooth | very smooth | very smooth | very smooth |
| 4-B | smooth | semi-smooth | sl. rough | rough | rough | rough | rough | very rough |
| 4-C | semi-smooth | rough | very rough | very rough | very rough | very rough | very rough | very rough |
| 4-D | smooth | smooth | smooth | smooth | smooth | smooth | semi smooth | sl. rough |
| 4-E | smooth | smooth | smooth | smooth | smooth | semi smooth | rough | rough |
| 4-F | very smooth | smooth | rough | very rough | very rough | very rough | very rough | very rough |
| 4-G | smooth | sl. rough | sl. rough | rough | rough | rough | rough | rough |
| 4-H | very smooth | rough lumpy | very rough lumpy | very rough lumpy | very rough lumpy | very rough lumpy | very rough lumpy | very rough lumpy |
| 4-I | smooth | very smooth | very smooth | very smooth | very smooth | very smooth | very smooth | very smooth |

TABLE E

| | 10 rpm | 20 rpm | 30 rpm | 40 rpm | 50 rpm |
|---|---|---|---|---|---|
| 5-A | Very smooth/high char | Very smooth/char | Very smooth/char | Very smooth/slight char | Very smooth/very slight char |
| 5-B | Very smooth/no char | Very smooth/no char | Very smooth/no char | Very smooth/no char | Very smooth/no char |
| 5-C | Very smooth/very slight char | Very smooth/no char | Very smooth/no char | Very smooth/no char | Very smooth/no char |
| 5-D | Very smooth/slight char | Very smooth/very slight char | Very smooth/no char | Very smooth/no char | Very smooth/no char |
| 5-E | Very smooth/high char | Very smooth/char | Very smooth/char | Very smooth/char | Very smooth/slight char |
| 5-F | Very smooth/high char | Very smooth/char | Very smooth/char | Very smooth/char | Very smooth/very slight char |

TABLE F

| DTS STABILITY | Time, min. | Torque, mg. | Temp., °C. |
|---|---|---|---|
| 5-A | 3.3 | 2030 | 224 |
| 5-B | 16.4 | 1780 | 224 |
| 5-C | 13.7 | 2000 | 224 |
| 5-D | 11.3 | 1790 | 225 |
| 5-E | 6.8 | 1830 | 224 |
| 5-F | 7.3 | 1810 | 224 |

What is claimed is:

1. An extruded profile having smooth surface appearance made from a chlorinated polyvinyl chloride blend, said blend comprising 100 weight parts of chlorinated polyvinyl chloride containing from 62% to 72% chlorine and 10 to 30 weight parts chlorinated polyethylene, the blend comprising any one of the following:

(a) chlorinated polyvinyl chloride containing 62% to 64% chlorine, said chlorinated polyethylene having a real average molecular weight of from 90,000 to 130,000 and a polydispersity of from 4 to 8, said blend (a) extruded in a shear range of from 100 $S^{-1}$ to 600 $S^{-1}$;

(b) chlorinated polyvinyl chloride containing 64.1% to 66% chlorine, said chlorinated polyethylene having a real average molecular weight of from 90,000 to 130,000 and a polydispersity of from 4 to 8 said blend (b) extruded in a shear range of from 350 $S^{-1}$ to 4,000 $S^{-1}$;

(c) said chlorinated polyvinyl chloride containing 64.1% to 66% chlorine, said chlorinated polyethylene having a chlorine content of from 38% to 44% chlorine, a real average molecular weight of from 170,000 to 220,00 and a polydispersity of from 4 to 8, said blend (c) extruded in a shear range of from 400 $S^{-1}$ to 500 $S^{-1}$;

(d) said chlorinated polyvinyl chloride containing 66.1% to 69% chlorine, said chlorinated polyethylene having a real average molecular weight of from 90,000 to 130,00 and a polydispersity of from 4–8, said blend (d) extruded in a shear range of from 300 $S^{-1}$ to 600 $S^{-1}$;

(e) said chlorinated polyvinyl chloride containing 66.1% to 69% chlorine, said chlorinated polyethylene having a real average molecular weight of from 150,000 to 200,000 and a polydispersity of from 3–8, said blend (e) extruded in a shear range of from 400 $S^{-1}$ to 1,300 $S^{-1}$;

(f) said chlorinated polyvinyl chloride containing 66.1% to 69% chlorine, said chlorinated polyethylene having a real average molecular weight of from 290,000 to 330,000 and a polydispersity of from 8–14, said blend (f) extruded in a shear range of from 500 $S^{-1}$ to 650 $S^{-1}$;

(g) said chlorinated polyvinyl chloride containing from 69.1% to 72% chlorine, said chlorinated polyethylene having a real average molecular weight of from 90,000 to 130,000 and a polydispersity of from 4–8, said blend (g) extruded in a shear range of from 350 $S^{-1}$ to 3,500 $S^{-1}$;

(h) said chlorinated polyvinyl chloride containing from 69.1 to 72% chlorine, said chlorinated polyethylene having a real average molecular weight of from 150,000 to 200,000 and a polydispersity of from 3–8, said blend (h) extruded in a shear range of from 300 $S^{-1}$ to 1,000 $S^{-1}$; or (i) said chlorinated polyvinyl chloride containing from 69.1% to 72% chlorine, said chlorinated polyethylene having a real average molecular weight of from 290,000 to 330,000 and a polydispersity of from 8–14, said blend (i) extruded in a shear range of from 350 $S^{-1}$ to 500 S-1.

2. The extruded profile of claim 1 made from the blend (a) wherein said chlorinated polyethylene has a real average molecular weight of from 115,000 to 125,000 a polydispersity of from 5–7 and a chlorine content of from 32% to 42%.

3. The extruded profile of claim 1 made from the blend (b) wherein said chlorinated polyethylene has a polydispersity of from 5–6 and a chlorine content of from 32% to 42%.

4. The extruded profile of claim 1 made from the blend (f) wherein said chlorinated polyethylene has a real average molecular weight of from 310,000 to 325,000 a polydispersity of from 10–13 and a chlorine content of from 32% to 42%.

5. The extruded profile of claim 1 wherein said chlorinated polyvinyl chloride has a chlorine content of greater than 65% and less than or equal to 72%.

6. The extruded profile of claim 1 wherein chlorinated polyethylene is present at from 15 to 25 weight parts per 100 weight parts of chlorinated polyvinyl chloride.

7. The extruded profile of claim 1 in the shape of a window spacer, a glazing bead, a window lineal, and a track for lighting.

8. A method of making an extruded profile having good surface appearance comprising extruding a composition according to claim 1.

9. An extruded profile having a smooth surface appearance made from a chlorinated polyvinyl chloride blend, said blend comprising 100 weight parts of a chlorinated polyvinyl chloride containing from 69.1% to 72% chlorine and 10 to 30 weight parts chlorinated polyethylene, said chlorinated polyethylene having a real molecular weight of from 170,000 to 220,000 and a polydispersity of from 7–9 said blend extruded in a shear range of from 500 $S^{-1}$ to 3,500 $S^{-1}$.

10. A method of making an extruded profile having good surface appearance comprising extruding a composition in the shear range of from 100 to 3,500 reciprocal seconds, said composition comprising 100 weight parts of chlorinated polyvinyl chloride containing from 69.1% to 72% chlorine and from 10 to 30 weight parts of chlorinated polyethylene, said chlorinated polyethylene having a real molecular weight of from 170,000 to 220,000 and a polydispersity of from 7–9.

11. An extruded profile having smooth surface appearance made from a chlorinated polyvinyl chloride blend, said blend comprising 100 weight parts of chlorinated polyvinyl chloride containing from 62% to 72% chlorine and 10 to 30 weight parts chlorinated polyethylene, and a stabilizer the blend comprising any one of the following:

(a) chlorinated polyvinyl chloride containing 62% to 64% chlorine, said chlorinated polyethylene having a real average molecular weight of from 90,000 to 130,000 and a polydispersity of from 4 to 8, said blend (a) extruded in a shear range of from 100 $S^{-1}$ to 600 $S^{-1}$;

(b) chlorinated polyvinyl chloride containing 64.1% to 66% chlorine, said chlorinated polyethylene having a real average molecular weight of from 90,000 to 130,000 and a polydispersity of from 4 to 8 said blend (b) extruded in a shear range of from 350 $S^{-1}$ to 4,000 $S^{-1}$;

(c) said chlorinated polyvinyl chloride containing 64.1% to 66% chlorine, said chlorinated polyethylene having a chlorine content of from 38% to 44% chlorine, a real average molecular weight of from 170,000 to 220,00 and a polydispersity of from 4 to 8, said blend (c) extruded in a shear range of from 400 $S^{-1}$ to 500 $S^{-1}$;

(d) said chlorinated polyvinyl chloride containing 66.1% to 69% chlorine, said chlorinated polyethylene having a real average molecular weight of from 90,000 to 130,00 and a polydispersity of from 4–8, said blend (d) extruded in a shear range of from 300 $S^{-1}$ to 600 $S^{-1}$;

(e) said chlorinated polyvinyl chloride containing 66.1% to 69% chlorine, said chlorinated polyethylene having a real average molecular weight of from 150,000 to 200,000 and a polydispersity of from 3–8, said blend (e) extruded in a shear range of from 400 $S^{-1}$ to 1,300 $S^{-1}$;

(f) said chlorinated polyvinyl chloride containing 66.1% to 69% chlorine, said chlorinated polyethylene having a real average molecular weight of from 290,000 to 330,000 and a polydispersity of from 8–14, said blend (f) extruded in a shear range of from 500 $S^{-1}$ to 650 $S^{-1}$;

(g) said chlorinated polyvinyl chloride containing from 69.1% to 72% chlorine, said chlorinated polyethylene having a real average molecular weight of from 90,000 to 130,000 and a polydispersity of from 4–8, said blend (g) extruded in a shear range of from 350 S$^{-1}$ to 3,500 S$^{-1}$;

(h) said chlorinated polyvinyl chloride containing from 69.1 to 72% chlorine, said chlorinated polyethylene having a real average molecular weight of from 150,000 to 200,000 and a polydispersity of from 3–8, said blend (h) extruded in a shear range of from 300 S$^{-1}$ to 1,000 S$^{-1}$; or (i) said chlorinated polyvinyl chloride containing from 69.1% to 72% chlorine, said chlorinated polyethylene having a real average molecular weight of from 290,000 to 330,000 and a polydispersity of from 8–14, said blend (i) extruded in a shear range of from 350 S$^{-1}$ to 500 S-1.

12. The extruded profile of claim 11, wherein said stabilizer is chosen from the group comprising acid acceptors, polyols or epoxidized oils.

13. The extruded profile of claim 12, wherein said acid acceptors is chosen from the group comprising: potassium citrates, aluminum magnesium hydroxy carbonate hydrates, magnesium aluminum silicates, and alkali metal alumino silicates.

14. The extruded profile of claim 11 made from the blend (a) wherein said chlorinated polyethylene has a real average molecular weight of from 115,000 to 125,000 a polydispersity of from 5–7 and a chlorine content of from 32% to 42%.

15. The extruded profile of claim 11 made from the blend (b) wherein said chlorinated polyethylene has a polydispersity of from 5–6 and a chlorine content of from 32% to 42%.

16. The extruded profile of claim 11 made from the blend (f) wherein said chlorinated polyethylene has a real average molecular weight of from 310,000 to 325,000 a polydispersity of from 10–13 and a chlorine content of from 32% to 42%.

17. The extruded profile of claim 11 wherein said chlorinated polyvinyl chloride has a chlorine content of greater than 65% and less than or equal to 72%.

18. The extruded profile of claim 11 wherein chlorinated polyethylene is present at from 15 to 25 weight parts per 100 weight parts of chlorinated polyvinyl chloride.

19. The extruded profile of claim 11 in the shape of a window spacer, a glazing bead, a window lineal, and a track for lighting.

20. A method of making an extruded profile having good surface appearance comprising extruding a composition according to claim 11.

21. An extruded profile having a smooth surface appearance made from a chlorinated polyvinyl chloride blend, said blend comprising 100 weight parts of a chlorinated polyvinyl chloride containing from 69.1% to 72% chlorine and 10 to 30 weight parts chlorinated polyethylene, said chlorinated polyethylene having a real molecular weight of from 170,000 to 220,000 and a polydispersity of from 7–9 said blend extruded in a shear range of from 500 S$^{-1}$ to 3,500 S$^{-1}$.

22. A method of making an extruded profile having good surface appearance comprising extruding a composition in the shear range of from 100 to 3,500 reciprocal seconds, said composition comprising 100 weight parts of chlorinated polyvinyl chloride containing from 69.1% to 72% chlorine and from 10 to 30 weight parts of chlorinated polyethylene, said chlorinated polyethylene having a real molecular weight of from 170,000 to 220,000 and a polydispersity of from 7–9.

* * * * *